United States Patent
Engert et al.

(10) Patent No.: US 11,555,507 B2
(45) Date of Patent: Jan. 17, 2023

(54) TURBOCOMPRESSOR WITH ADAPTED MERIDIAN CONTOUR OF THE BLADES AND COMPRESSOR WALL

(71) Applicant: ebm-papst Mulfingen GmbH & Co. KG, Mulfingen (DE)

(72) Inventors: Markus Engert, Lauda-Königshofen (DE); Angelika Klostermann, Gaisbach (DE); Daniel Conrad, Langenbrettach (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 0 days.

(21) Appl. No.: 17/312,511

(22) PCT Filed: Nov. 29, 2019

(86) PCT No.: PCT/EP2019/083080
§ 371 (c)(1),
(2) Date: Jun. 10, 2021

(87) PCT Pub. No.: WO2020/126413
PCT Pub. Date: Jun. 25, 2020

(65) Prior Publication Data
US 2022/0049712 A1 Feb. 17, 2022

(30) Foreign Application Priority Data
Dec. 19, 2018 (DE) ..................... 10 2018 132 978.4

(51) Int. Cl.
*F04D 29/18* (2006.01)
*F04D 19/00* (2006.01)
*F04D 29/52* (2006.01)

(52) U.S. Cl.
CPC ......... *F04D 29/181* (2013.01); *F04D 19/002* (2013.01); *F04D 29/522* (2013.01)

(58) Field of Classification Search
CPC ........ F04D 17/00; F04D 29/28; F04D 29/284; F04D 29/42; F04D 29/526
See application file for complete search history.

(56) References Cited

U.S. PATENT DOCUMENTS

| 2,737,898 A | 3/1956 | Andermatt et al. |
| 4,093,401 A * | 6/1978 | Gravelle ............... F04D 29/284 416/185 |

(Continued)

FOREIGN PATENT DOCUMENTS

| CN | 104364493 A | 2/2015 |
| DE | 1057137 B | 5/1959 |

(Continued)

OTHER PUBLICATIONS

German Search Report from co-pending German Application No. 102018132978.4 dated Nov. 29, 2019.

(Continued)

*Primary Examiner* — Aaron R Eastman
(74) *Attorney, Agent, or Firm* — Harness, Dickey & Pierce, P.L.C.

(57) ABSTRACT

The invention relates to a turbocompressor (1) comprising a compressor housing (2) and a compressor wheel (4) with blades (5). The compressor wheel (4) is rotatably mounted relative to the compressor housing (2) and is arranged such that the exposed upper edges of the blades (5) are spaced from a compressor housing (2) wall (3) facing the blade upper edges across a head gap (7), wherein both the upper edges of the blades (5) as well as the housing wall (3) have at least one recess (11, 13) and at least one elevation (10, 14) over the respective Meridian contour, said recess and elevation interacting locally such that the head gap (7) defines a Z-shaped course in the region of the recesses (11, 13) and the elevations (10, 14) when viewed on a Meridian plane.

11 Claims, 3 Drawing Sheets

(56) References Cited

U.S. PATENT DOCUMENTS

| | | | | |
|---|---|---|---|---|
| 5,375,974 | A | * | 12/1994 | Heinrich ............. F04D 29/4213 |
| | | | | 415/206 |
| 7,255,531 | B2 | * | 8/2007 | Ingistov .................. F01D 11/08 |
| | | | | 415/173.1 |
| 2011/0091323 | A1 | * | 4/2011 | Koike ................... F04D 29/665 |
| | | | | 416/175 |
| 2015/0176422 | A1 | * | 6/2015 | Dimova ............... F04D 29/162 |
| | | | | 415/174.5 |
| 2015/0184672 | A1 | * | 7/2015 | Nishi .................... B23P 15/006 |
| | | | | 416/223 R |
| 2017/0191490 | A1 | * | 7/2017 | Annati .................... F01D 5/048 |
| 2017/0198712 | A1 | * | 7/2017 | Berenyi ............... F04D 29/284 |
| 2017/0198713 | A1 | * | 7/2017 | Bessho .............. F04D 29/4213 |
| 2017/0314576 | A1 | * | 11/2017 | Jonen ...................... F04D 29/02 |
| 2018/0094637 | A1 | * | 4/2018 | Van Houten .......... F04D 29/685 |
| 2019/0234416 | A1 | * | 8/2019 | Morinaka ............... F01D 11/02 |

FOREIGN PATENT DOCUMENTS

| | | |
|---|---|---|
| DE | 102013201763 A1 | 8/2014 |
| DE | 102013201771 A1 | 8/2014 |
| DE | 102016001484 A1 | 8/2017 |
| FR | 893205 A | 6/1944 |
| WO | WO-2014004238 A1 | 1/2014 |

OTHER PUBLICATIONS

International Search Report and Written Opinion of the International Searching Authority, issued in PCT/EP2019/083080, dated Feb. 11, 2020; ISA/EP.

Chinese Office Action dated Sep. 5, 2022 in corresponding Chinese Application No. 201980077274.1.

* cited by examiner

TURBOCOMPRESSOR WITH ADAPTED MERIDIAN CONTOUR OF THE BLADES AND COMPRESSOR WALL

CROSS-REFERENCE TO RELATED APPLICATIONS

This application is a 371 U.S. National Phase of International Application No. PCT/EP2019/083080, filed Nov. 29, 2019, which claims priority to German Patent Application No. 10 2018 132 978.4, filed Dec. 19, 2018.

FIELD

The disclosure relates to a turbocompressor with a compressor housing and a compressor wheel with blades. The compressor wheel is rotatably mounted relative to the compressor housing and is spaced apart therefrom via a head gap. The head gap is between exposed upper edges of the blades and a compressor wall of the compressor housing facing the blade upper edges.

SUMMARY

In prior art turbocompressors, the compressor wheel, equipped with blades, rotates relative to the stationary compressor housing and generates an axially intake and radially discharged main flow. The head gap, which is to be kept as small as possible, is provided between the blades of the compressor wheel and the housing wall. The head gap enables the compressor wheel to rotate without contact. When viewed in the meridian plane of the compressor wheel, the head gap runs along the blade upper edge and the housing wall. Both the housing wall and the blade upper edge have a continuous course from the axial intake side to the radial discharge side. In turbocompressors, the meridian plane is defined as any plane extending through the axis of rotation as viewed in the circumferential direction.

The problem is that in the case of low mass flows, the compressor characteristic, which is determined by a constant-speed characteristic in the diagram of pressure buildup plotted over mass flow, is aerodynamically limited by the separation limit of the flow or by the surge limit.

It is therefore an object of the disclosure to shift the compressor characteristic of the turbocompressor for small mass flows in such a manner that the separation limit of the flow or the surge limit is shifted in the direction of smaller mass flows. Thus, the operating range of the turbocompressor is increased. At the same time, efficiency and pressure buildup are increased.

The object is achieved by the combination of features with a turbocompressor comprising a compressor housing and a compressor wheel with blades. The compressor wheel is rotatably mounted relative to the compressor housing and is spaced apart therefrom by a head gap. The head gap is between exposed upper blade edges of the blades and a compressor wall of the compressor housing facing the blade upper edges. Both the upper blade edges of the blades and the housing wall each have at least one recess and at least one elevation over their respective meridian contour. The at least one recess and at lease one elevation interact locally so that, when viewed in a meridian plane, the head gap in the region of the recesses and the elevations determines a Z-shaped course.

According to the disclosure, a turbocompressor comprises a compressor housing and a compressor wheel with blades. The compressor wheel is rotatably mounted relative to the compressor housing and is spaced apart therefrom via a head gap. The head gap is between exposed upper edges of the blades and a compressor wall of the compressor housing facing the blade upper edges. Both the upper edges of the blades and the housing wall each have at least one recess and at least one elevation over their respective meridian contour. The recess and elevation interact locally so that, viewed in a meridian plane, the head gap in the region of the recess and the elevation determines a Z-shaped course.

Due to the particular design of the blade upper edges and the housing wall facing each other, a return flow against the axially intaken and radially discharged main flow is generated within the head gap. Viewed over the continuous meridian, the blade upper edges and the housing wall have a discontinuous contour that is formed in each case by interacting recesses and directly adjoining elevations at the blade upper edges and the housing wall relative to the continuous meridian. The Z-shaped course of the head gap is determined by two transverse legs and a connecting leg connecting the transverse legs. The recesses serve to form the two transverse legs and the elevations to form the one connecting leg.

Preferably, the recesses of the blade upper edges are shaped complementary to the elevation of the housing wall. The recesses of the housing wall are shaped complementary to the elevation of the blade upper edges. This forms the Z-shaped course of the head gap.

The return flow through the head gap counter to the main flow generated by the compressor wheel meets the recesses or elevations of the blade upper edges or the housing wall, thereby encounters an obstruction and flows back into the main flow. In this way, the advantageous flow effects serving to solve the objects are achieved.

The positioning of the recesses or the complementary elevations on the blade upper edges or the housing wall also influences the effect in an advantageous manner. Here, a meridian length L of the compressor wheel from its axial leading edge at the intake side to its radial trailing edge at the discharge side is determined between the values $0<L<1$. A preferred and fluidically optimum design is one where the at least one recess and the at least one elevation of the housing wall and the blade upper edges are formed in a range of $0.3<L<0.7$, more preferably $0.4<L<0.5$.

In terms of the formation of the Z-shaped course of the head gap, as viewed in the meridian plane, an embodiment is advantageous where the housing wall and the blades each have stop surfaces directed towards one another for a flow through the head gap. The stop surfaces thus extend perpendicularly or angled with respect to the upstream or downstream flow section of the head gap, as viewed in the meridian, so that the return flow through the head gap bounces against the stop surface and is fed back to the oppositely running main flow. As a result of the fact that recesses and elevations are provided both on the blade upper edges and on the housing wall, the stop surfaces extend perpendicularly or substantially perpendicularly to the return flow. However, the head gap is nevertheless maintained in the entire region between the compressor wheel and the compressor housing, i.e. also in the Z-shaped section of the recesses and elevations.

In an advantageous embodiment variant, the stop surfaces on the housing wall and the blade upper edges run parallel with respect to an axial plane perpendicular to the axis of rotation of the compressor wheel at an angle α which, facing the intake side of the compressor wheel, is greater than 0°, preferably 15-45°. This enables the stop surface on the housing wall to be aligned at an angle to the main flow and that the return flow in the head gap is already deflected back in the direction of the main flow via the stop surface.

In one exemplary embodiment of the turbocompressor, the head gap has a constant head gap width. The "head gap width" is determined here by the distance between the blade upper edge and the housing wall. This is achieved by an exactly complementary shape of the elevations and recesses at the blade upper edges and the housing wall over the entire course of the meridian contour.

Alternative exemplary embodiments of the turbocompressor for this purpose are the head gap has a first head gap width (a) in a section adjacent to the blade edge at the intake side, a second head gap width (b) in a section adjacent to the blade edge at the discharge side, and a radial head gap length (c) extending between the stop surfaces in the region of the recess and the elevation. The head gap widths or head gap length is $a<c<b$ (first variant) or $a>c>b$ (second variant). In the first variant, the flow cross-section of the head gap decreases from sections axially on the intake side to sections radially on the discharge side, while in the second variant it increases. This is implemented as an embodiment variant by enlarged recesses provided on one side only, i.e. only at the blade upper edges or only at the housing wall, or alternatively by enlarged elevations.

A further embodiment also comprises turbocompressors where both the upper edges of the blades and the housing wall each have, over their respective meridian contour, a plurality of recesses as well as a plurality of elevations. Each one interacts locally such that the head gap in the region of the recesses and the elevations, as viewed in the meridian plane, determines a repeating Z-shaped course. In other words, the particular discontinuous contour can be repeated over the meridional length of the blades.

In a further development, the turbocompressor compressor wheel has blades each with a different axial extent. They are arranged alternately to one another in the circumferential direction and are curved in the circumferential direction. The blades having a shorter axial extent are preferably arranged as intermediate blades (also called splitter blades) between blades having a greater axial extent.

In a particular configuration, the blades having a greater axial extent overlap the intermediate blades in an intake-side axial plan view or projection of the compressor wheel. This is implemented by the curved shape of the blades having a greater axial extent, which continues to run in a region of the circumference of the compressor wheel in which the intermediate blades do not run.

In a further embodiment variant the turbocompressor at least or exclusively the blades having a greater axial extent have both the at least one recess and the at least one elevation over their respective meridian contour. This means that compressor wheels with intermediate blades, the meridian contour of which is continuous and without recesses and elevations, are also included.

DRAWINGS

The drawings described herein are for illustrative purposes only of selected embodiments and not all possible implementations, and are not intended to limit the scope of the present disclosure.

Other advantageous further embodiments of the disclosure are illustrated in the subclaims or are illustrated in more detail below together with the description of the preferred embodiment of the disclosure with reference to the figures FIG. 1 is a schematic view of a turbocompressor cut in the meridian plane according to a first exemplary embodiment;

DETAILED DESCRIPTION

Figure 1:
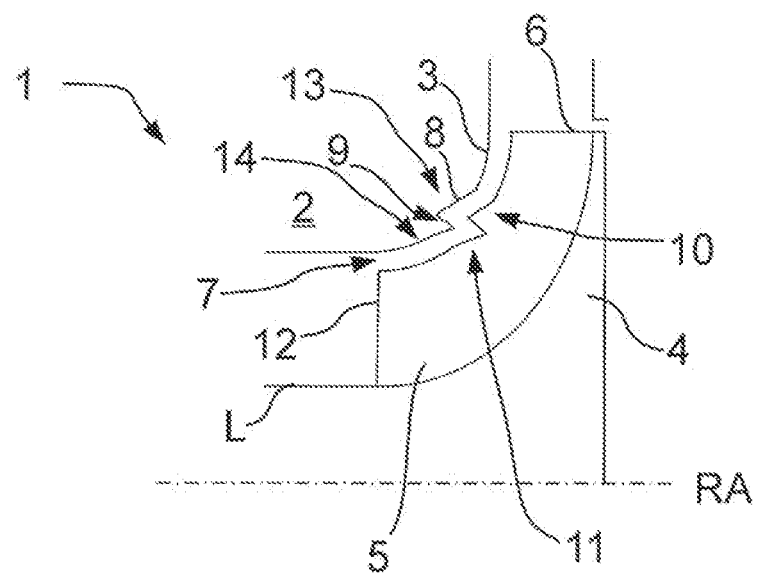
Figure 2:
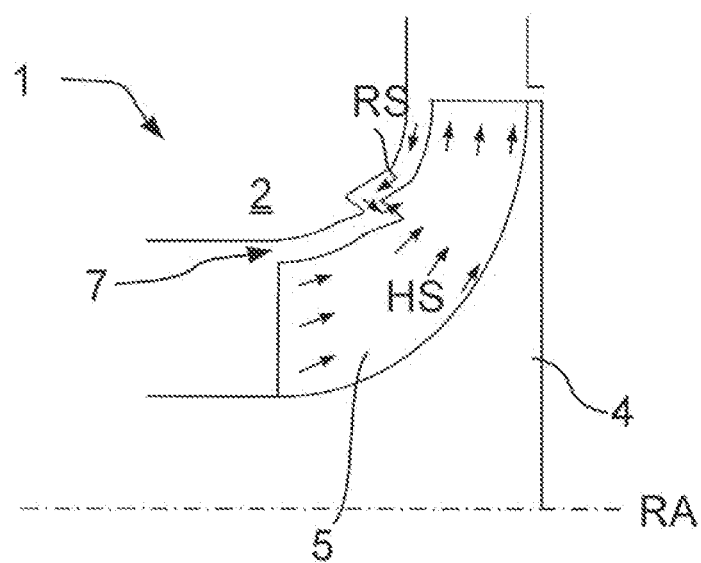
FIG. 2 is a schematic view of the turbocompressor according to FIG. 1.

FIGS. 1 and 2 schematically show a section of a turbocompressor 1 cut in the meridian plane. Only the regions of the turbocompressor relevant to the disclosure are shown. In all other respects, a person skilled in the art will refer to the structure known from the prior art.

Figure 4:
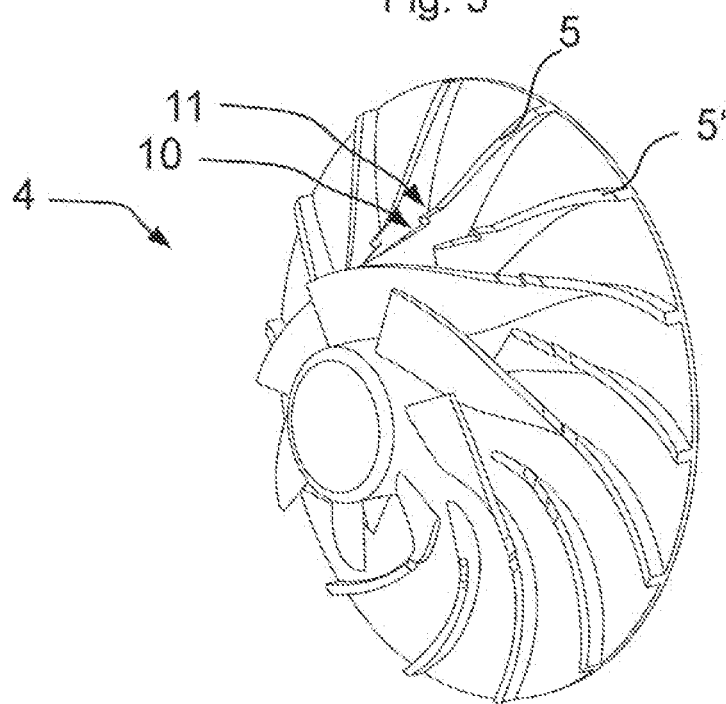
FIG. 4 is a perspective view of the compressor wheel of the turbocompressor according to FIGS. 1 and 2.

The turbocompressor 1 has the compressor housing 2 and the compressor wheel 4 with its blades 5 distributed in the circumferential direction. The compressor wheel is also shown in FIG. 4. Driven by a motor (not shown), the compressor wheel 4 rotates about the axis of rotation RA. It takes in air axially and discharges it radially. A corresponding main flow HS is shown in FIG. 2.

The head gap 7, which allows rotation of the compressor wheel 4, is provided between the stationary housing wall 3 of the compressor housing 2 and the upper edges of the blades 5. The blade upper edges are exposed, not covered by a cover disk.

Along their respective meridian contours, both the upper edges of the blades 5 and the housing wall 3 are adapted such that a return flow RS, flowing through the head gap 7 (see FIG. 2), is deflected in the opposite direction and fed back again to the main flow HS. For this purpose, a recess 11 and an elevation 10 are provided on the upper edges of the blades 5 with respect to the meridian course in the flow direction of the main flow HS, as seen from the leading edge 12 of the compressor wheel 4 on the intake side to its trailing edge 6 on the discharge side. In complementary form, the housing wall 3 is formed with the recess 13, opposite the elevation 10 of the blade 5, and with the elevation 14, opposite the recess 11 of the blade 5. The discontinuous meridian contour results in that the head gap 7, when viewed in a meridian plane, determines a Z-shaped course. The course is mirrored in the view according to FIGS. 1 and 2.

Depending on the side where the blades 5 are viewed, the Z-shaped or mirrored Z-shaped course also results in the housing wall 3 and the blades 5 each having two transverse legs 8 that are retracted relative to the meridian course, as well as stop surfaces 9, 9' are directed towards one another for the flow through the head gap 7. In the embodiment shown, the stop surface 9 of the housing wall 3 is the main obstacle for the return flow RS and guides the return flow RS back into the main flow HS. The stop surfaces 9, 9' inclined at an angle α relative to a perpendicular to the tangent T of the meridian course of the housing wall 3 or the blade upper edges of the compressor wheel 4 (see FIG. 3). The angle α is preferably in a range of 0°±15°, in the embodiment shown at −10°. The Z-shaped course is thus changed to a lightning-shaped course with a clear reverse direction of the stop surface 9 back into the main flow HS and thus improved recirculation of the return flow RS.

Figure 3:
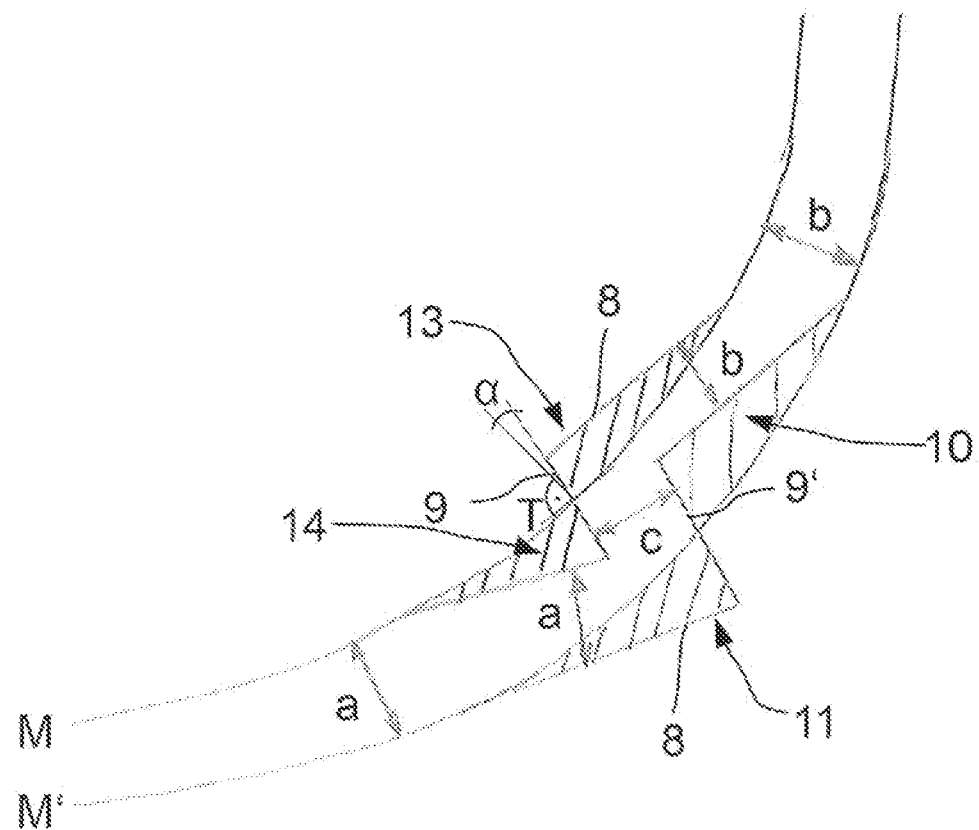
FIG. 3 is a detailed view of the head gap of the turbocompressor according to FIGS. 1 and 2.

The corresponding design of the housing wall 3 and the upper edges of the blade 5 is shown in more detail in FIG. 3. The adaptation of the meridian contour can clearly be seen with recess 11 and elevation 10 of the blade upper edge with respect to the meridian course M' and of the meridian contour with recess 14 and elevation 13 of the housing wall 3 with respect to the meridian course M. The hatched areas determine the respective size of the deviations with respect to the continuous meridian courses M, M'. In addition, the head gap width (a), (b) determined by the distance between the upper edge of the blade 5 and the housing wall 3, as well as the head gap length (c) between the stop surfaces 9, 9', are also plotted in FIG. 3. Here a>c>b in the embodiment example shown. The elevation 14 of the housing wall 3 and the recess 11 of the blade upper edge as well as the elevation 10 of the blade upper edge and the recess 13 of the housing wall 3 are the same in each case. Thus, the head gap widths a and b remain constant in each case.

Furthermore, the meridian length L of the compressor wheel 4 is plotted in FIG. 1 from its leading edge 12 on the intake side to its trailing edge 6 on the discharge side. The length is specified between the values 0<L<1 to determine that the Z-shaped course formed by the recesses 11, 13 and elevations 10, 14 is about 0.47 in the exemplary embodiment shown. Measurements are taken at the mean head gap length c.

Figure 5:
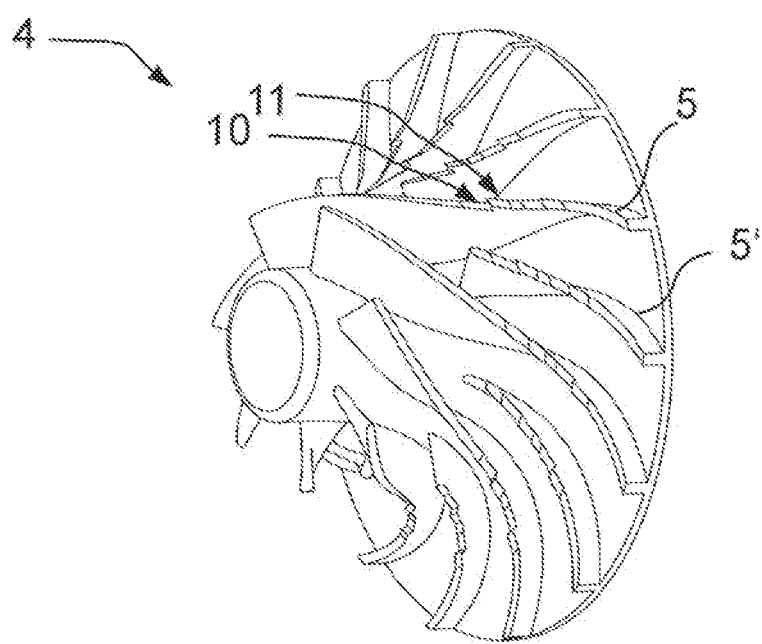
FIG. 5 is a perspective view of an alternative exemplary embodiment of a compressor wheel.

FIGS. 4 and 5 show different exemplary embodiments of compressor wheels 4. The compressor wheels 4 each have blades 5, each with a different axial extent, that are arranged alternately with respect to one another in the circumferential direction and are curved in the circumferential direction. The blades having a shorter axial extent or meridian extent are arranged as intermediate blades 5' between the blades 5 having a greater axial extent or meridian extent. The curved course of the longer blades 5 results in the fact that, in axial projection, the intermediate blades 5' are covered. In the shown exemplary embodiments according to FIGS. 4 and 5, both the blades 5 and the intermediate blades 5' are formed with the elevation 10 and recess 11. It is also possible that only the blades 5 are formed accordingly and that the intermediate blades 5' have a continuous meridian contour. The embodiment of the compressor wheel 4 according to FIG. 5 differs in that the discontinuous meridian contour of the blade upper edges is formed multiple times over the course of the meridian. The housing wall 3 is then formed in a correspondingly complementary manner.

The entire disclosure applies to both radial compressor wheels and diagonal compressor wheels.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A turbocompressor comprising:
   a compressor housing and a compressor wheel with blades;
   the compressor wheel is rotatably mounted relative to the compressor housing and is spaced apart by a head gap, the head gap is between an exposed upper blade edges of the blades and a compressor wall of the compressor housing facing the blade upper edges;
   both the upper blade edges of the blades and the housing wall each have at least one recess and at least one elevation over their respective meridian course and the at least one recess is retracted relative to the meridian course so that the recess extends from the meridian course, the at least one recess and at least one elevation interact locally so that, when viewed in a meridian plane, the head gap in the region of the recesses and the elevations determines a Z-shaped course; and
   both the at least one recess and at least one elevation, in a discharge direction, includes a transverse leg and a stop surface, the transverse legs are continuous with and angle away from the meridian course toward the stop surface so that the transverse legs are retracted relative to the meridian course.

2. The turbocompressor according to claim 1, further comprising a meridian length (L) of the compressor wheel from its leading edge on an intake side to its trailing edge on a discharge side is determined between the values $0 \leq L \leq 1$ and the at least one recess and the at least one elevation are formed in a range $0.3 \leq L \leq 0.7$.

3. The turbocompressor according to claim 1, wherein the housing wall and the blades each have stop faces directed towards one another for a flow through the head gap.

4. The turbocompressor according to claim 3 wherein the stop faces run parallel at an angle α, $0° \leq \alpha \leq \pm 45°$, with respect to a perpendicular to a tangent (T) of the meridian course of the housing wall and/or of the blade upper edges of the compressor wheel.

5. The turbocompressor according to claim 1 wherein the head gap has a constant head gap width, and the head gap width is determined by the distance between the blade upper edge and the housing wall.

6. The turbocompressor according to claim 3 wherein the head gap has a first head gap width (a), in a section adjacent to a blade edge on an intake side, a second head gap width (b), in a section adjacent to the blade edge on a discharge side, and a radial head gap length (c), extending between the stop surfaces in the region of the recess and the elevation, where: a<c<b.

7. The turbocompressor according to claim 3, wherein the head gap width has a first head gap width (a), in a section adjacent to a blade edge on an intake side, a second head gap width (b), in a section adjacent to the blade edge on a discharge side, and a radial head gap length (c), extending between the stop faces in the region of the recess and the elevation, where: a>c>b.

8. The turbocompressor according to claim 1, wherein both the upper edges of the blades and the housing wall each have, over their respective meridian course, a plurality of recesses and a plurality of elevations which in each case interact locally such that the head gap in the region of the recesses and the elevations, as seen in the meridian plane, determine a repeating Z-shaped course.

9. The turbocompressor according to claim 1, wherein the compressor wheel has blades, each with a different axial extent, which are arranged alternately with respect to one another in the circumferential direction and are curved in the circumferential direction.

10. The turbocompressor according to claim 9, wherein the blades having a shorter axial extent are arranged as intermediate blades between blades having a greater axial extent, and the blades having a greater axial extent cover the intermediate blades in an intake-side axial plan view of the compressor wheel.

11. The turbocompressor according to claim 10 wherein at least or exclusively the blades having a greater axial extent include the at least one recess and the at least one elevation over their respective meridian course.

* * * * *